(12) United States Patent
Kim et al.

(10) Patent No.: US 6,935,545 B2
(45) Date of Patent: Aug. 30, 2005

(54) PINCH-ROLLER UNIT OF A MAGNETIC RECORDING/READING APPARATUS

(75) Inventors: Bong-joo Kim, Suwon (KR); Young-ho Cho, Suwon (KR); Byeng-bae Park, Ansan (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 8 days.

(21) Appl. No.: 10/609,472

(22) Filed: Jul. 1, 2003

(65) Prior Publication Data

US 2004/0047068 A1 Mar. 11, 2004

(30) Foreign Application Priority Data

Sep. 9, 2002 (KR) ......................................... 2002-54350

(51) Int. Cl.[7] .......................... B65H 20/02; G11B 15/29
(52) U.S. Cl. .......................... 226/187; 242/354; 360/95; 360/96.4
(58) Field of Search ........................ 226/187; 242/338.4, 242/354; 360/85, 95, 96.4, 96.2

(56) References Cited

U.S. PATENT DOCUMENTS

| | | | | |
|---|---|---|---|---|
| 4,482,085 A | * | 11/1984 | Tanaka et al. | 226/187 |
| 4,497,426 A | * | 2/1985 | Osanai | 226/187 |
| 5,277,352 A | * | 1/1994 | Ohkubo et al. | 226/187 |
| 5,833,109 A | * | 11/1998 | You | 226/187 |
| 2002/0053620 A1 | * | 5/2002 | Konishi et al. | 242/354 |

* cited by examiner

Primary Examiner—John M. Jillions
(74) Attorney, Agent, or Firm—Roylance, Abrams, Berdo & Goodman, L.L.P.

(57) ABSTRACT

A pinch roller unit of a magnetic recording/reading apparatus disposed on a main deck on which a head drum and a capstan are disposed to move in association with a sub-deck which is disposed to slide on the main deck. The pinch roller unit operates to bring a tape into close contact with the capstan, and comprises a pivoting lever rotatably disposed on the main deck to pivot towards the capstan in relation to movement of the sub-deck being loaded, a pinch roller rotatably disposed at an end of the pivoting lever and brought into contact with the capstan at the time of loading process, and a torsion spring stressed by being pushed by the sliding member sliding along the left and right directions of the main deck for pushing the pivoting lever towards the capstan.

10 Claims, 3 Drawing Sheets

PINCH-ROLLER UNIT OF A MAGNETIC RECORDING/READING APPARATUS

This application claims benefit under 35 U.S.C. § 119 from Korean Patent Application No. 2002-54350, filed on Sep. 9, 2002, the entire content of which is incorporated herein by reference.

BACKGROUND OF THE INVENTION

1. Field of the Invention

The present invention relates to a magnetic recording/reading apparatus, and more particularly, to a pinch-roller unit of a recording/reading apparatus for bringing a tape, which has been released from a cassette and loaded to contact a head drum, into close contact with a capstan.

2. Description of the Related Art

Generally, a magnetic recording/reading apparatus is an apparatus for recording information on a recording medium such as a magnetic tape, and reading the recorded information. Types of magnetic recording/reading apparatus include a Video Cassette Tape Recorder (VCR), a camcorder, and so on.

Referring to FIG. 1, a magnetic recording/reading apparatus comprises a main deck 10 on which a head drum 11 is rotatably disposed, a main sliding member 13 reciprocably disposed on the main deck 10 to slide in the direction A, a sub-deck 20 reciprocably disposed on the main deck 10 to slide in the direction B, and reel tables 15 on which two tape reels of a cassette tape seated on the sub-deck 20 are seated, with one of the reel tables 15 being driven to drive one of the tape reels. The magnetic recording/reproducing apparatus further comprises a pair of pole base units 16 and 17 for moving and supporting a tape to be wound around the head drum 11 when the sub-deck 20 is loaded, and a tape guiding apparatus for guiding the movement of the loaded tape.

The tape guiding apparatus comprises a capstan 18 fixed on the main deck 10, a pinch-roller unit 30 for bringing the tape into close contact with the capstan 18 in cooperation with the main sliding member 13, and a review arm unit 19 for providing constant tension to the tape.

In the above-described structure, the pinch-roller unit 30 comprises a pivoting lever 31 pivotably disposed on the main deck 10, a pinch-roller 33 rotatably disposed at the end of the pivoting lever 31, a pressing lever 35 rotatably disposed on the axis of the pivoting lever 31, and an extension spring 37 connecting the pressing lever 35 and the pivoting lever 31.

The pivoting lever 31 pivots by being pushed by the sub-deck 20 when a tape is being loaded and accordingly, the pinch-roller 33 comes into contact with the capstan 18. After the sub-deck 20 is loaded, the main sliding member 13 moves, thereby pushing the lower end of the pressing lever 35 to the left. The pressing lever 35 is then rotated clockwise and the extension spring 37 is extended. The pinch-roller 33 is brought into close contact with the capstan 18 by the tension of the extension spring 37.

It is noted, however, that a disadvantage of the apparatus described above is that the conventional pinch-roller unit 30 having the above-described structure is made up of many parts, thereby requiring large space and a large number of processes to assemble. In addition, a large number of parts increases manufacturing costs.

SUMMARY OF THE INVENTION

An object of the invention is to solve at least the above problems and/or disadvantages, and to provide at least the advantages described below.

Accordingly, one object of the present invention is to solve the foregoing problems by providing a pinch roller unit of a magnetic recording/reading apparatus having fewer parts and a more simplified structure than the conventional apparatus.

The foregoing and other objects and advantages are substantially realized by providing a pinch roller unit of a magnetic recording/reading apparatus that is disposed on a main deck on which a head drum and a capstan are disposed to move in relation to movement of a sub-deck which is disposed to slide on the main deck. The pinch roller unit is capable of bringing a tape into close contact with the capstan and comprises a pivoting lever rotatably disposed on the main deck to pivot towards the capstan in relation to movement of the sub-deck in a loading direction, a pinch roller rotatably disposed at an end of the pivoting lever and brought into contact with the capstan during the loading process, and a torsion spring that is stressed by being pushed by the sliding member sliding in the left and right directions of the main deck to push the pivoting lever towards the capstan.

The torsion spring is coaxially connected with the pivoting lever and prevented from being released from the pivoting lever, and can be stressed and released in a predetermined angle by being pushed by the sliding member.

BRIEF DESCRIPTION OF THE DRAWINGS

The above objects and features of the present invention will be more apparent by describing an embodiment of the present invention with reference to the accompanying drawings, in which.

DETAILED DESCRIPTION OF THE PREFERRED EMBODIMENT

Figure 1:
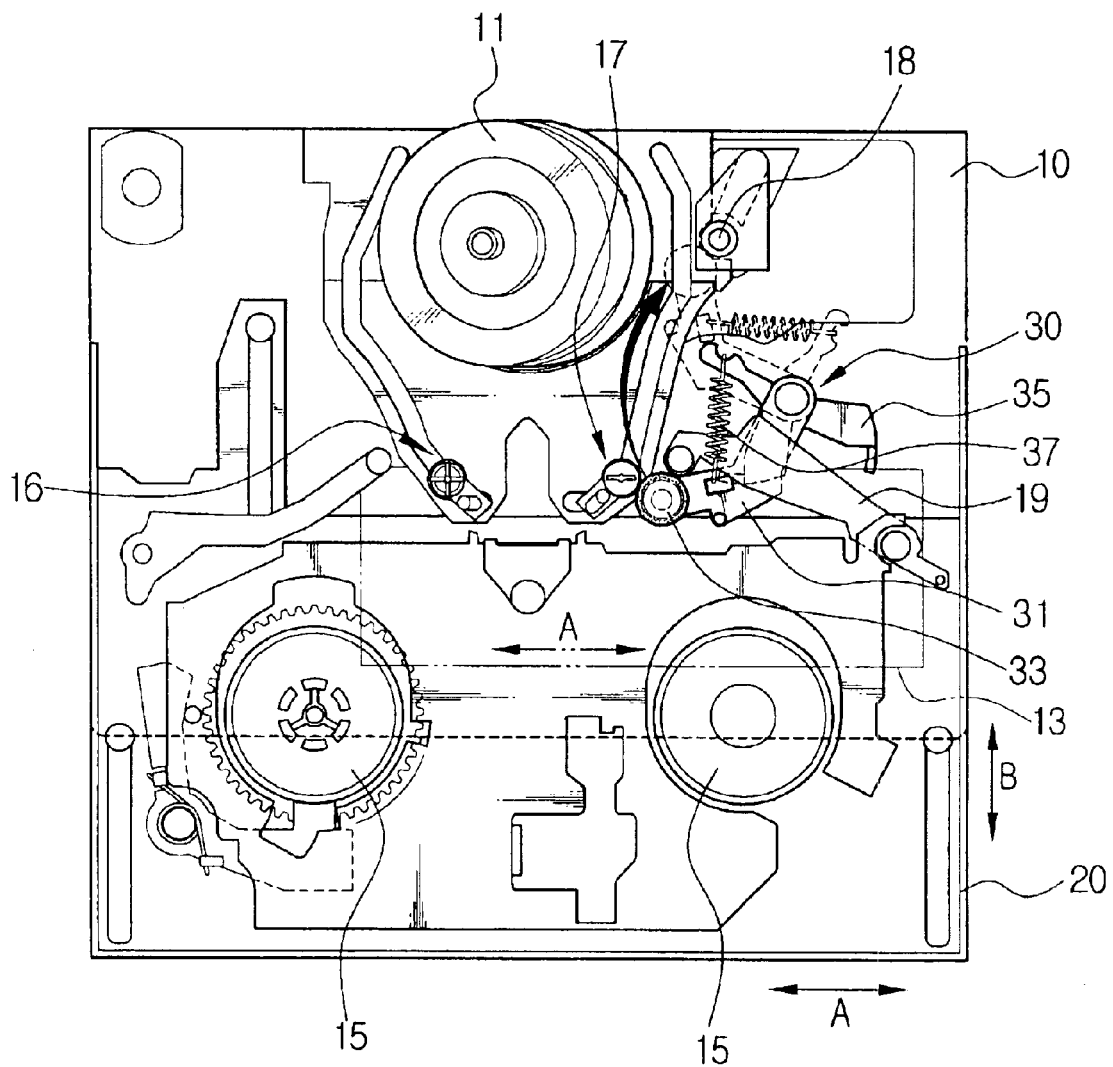
FIG. 1 is a plan view schematically showing a conventional magnetic recording/reading apparatus.

A pinch-roller unit of a magnetic recording/reading apparatus according to an embodiment of the present invention will now be described in greater detail with reference to the accompanying drawings. Elements identical to those shown in FIG. 1 are assigned the same reference numerals.

Figure 2:
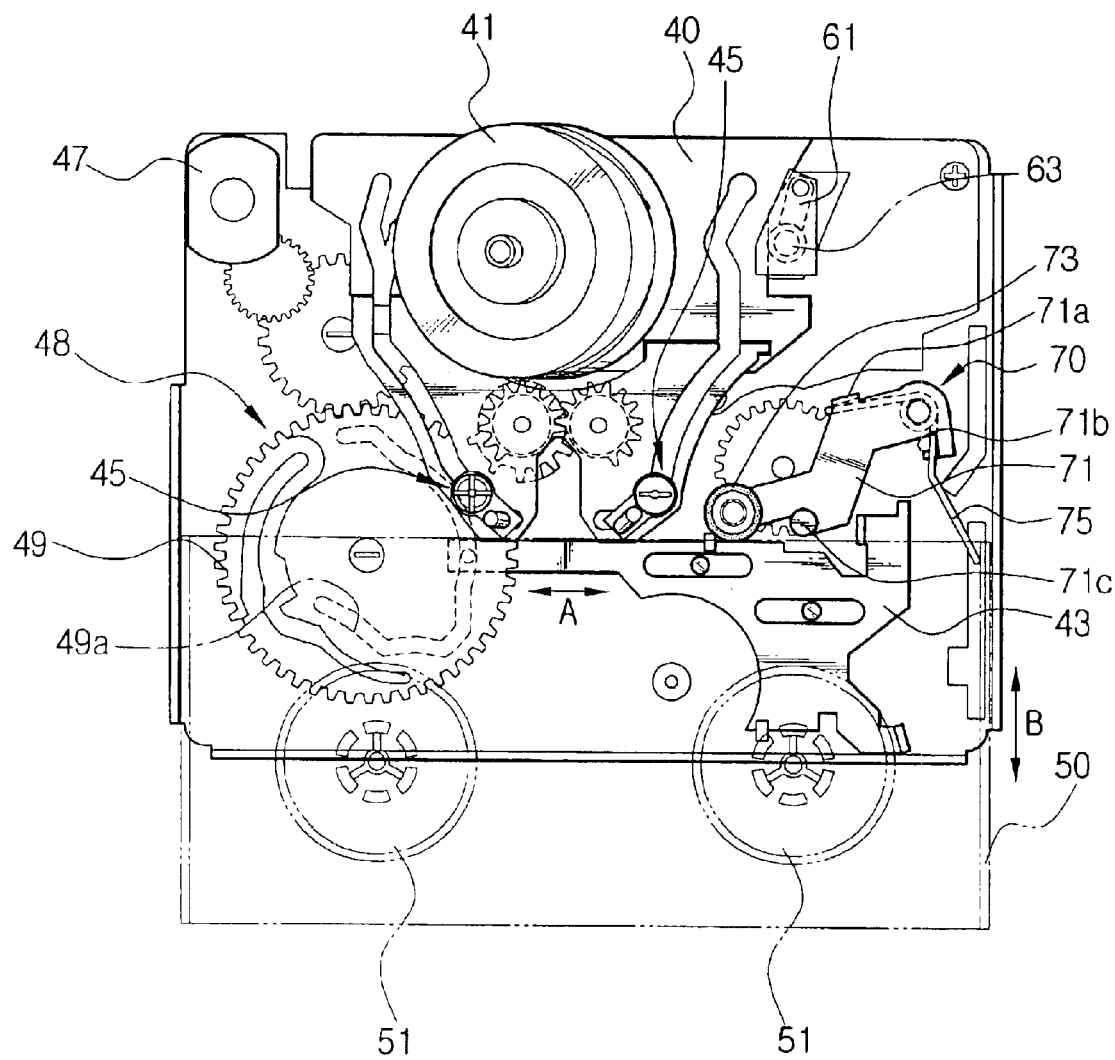
FIG. 2 is a plan view schematically showing a magnetic recording/reading apparatus having a pinch-roller unit according to an embodiment of the present invention.

FIG. 2 is a plan view schematically showing a magnetic recording/reading apparatus having a pinch-roller unit according to an embodiment of the present invention. Referring to the drawing, a head drum 41 is rotatably disposed on the main deck 40. The main deck 40 has a sliding member 43 disposed to reciprocate in the direction A, and a sub-deck 50 disposed to reciprocate in the direction B. The sub-deck 50 has a pair of reel tables 51 disposed on both sides on which the tape reels of the cassette are to be seated. In addition, the main deck 40 has a pair of pole base units 45 disposed for guiding the tape from the cassette to be wound around a head drum 41 when the sub-deck 50 is in the loaded position. Each pole base unit 45 is driven by a loading system 48 that is driven by the power supplied from a driving motor 47 disposed on the main deck 40. The loading system 48 comprises a plurality of gears. The sub-deck 50 becomes reciprocatable in the direction B also by the driving motor 47. Since loading system 48 of the sub-deck 50 is well-known to those in the art, its description will be omitted.

Additionally, a capstan 63 is disposed on the main deck 40 and is rotated by a capstan motor 61. The capstan motor 61 supplies power for driving the reel table 51 via a power transmission system (not shown). A plurality of guiding poles (not shown) are also disposed on the main deck 40 for guiding the movement of the tape.

The sliding member 43 reciprocates left and right, that is, in the direction A, in relation to movement of a cam gear 49 of the loading system 48. That is, the sliding member 43 moves in the direction A in association with the cam groove 49a formed on the cam gear 49.

The pinch-roller unit 70 according to an embodiment of the present invention comprises a pivoting lever 71 pivotably disposed on the main deck 40, a pinch-roller 73 rotatably disposed at the end of the pivoting lever 71, and a torsion spring 75 coaxially connected to the pivoting lever 71.

The pivoting lever 71 has one end rotatably disposed with respect to the main deck 40 and the pinch roller 73 disposed at the other end. The pivoting lever 71 is provided with protrusions 71a, 71b for supporting both ends of the torsion spring 75. The pinch roller 73, in contact with the capstan 63, guides the tape being conveyed when the sub-deck 50 is loaded.

Figure 3:
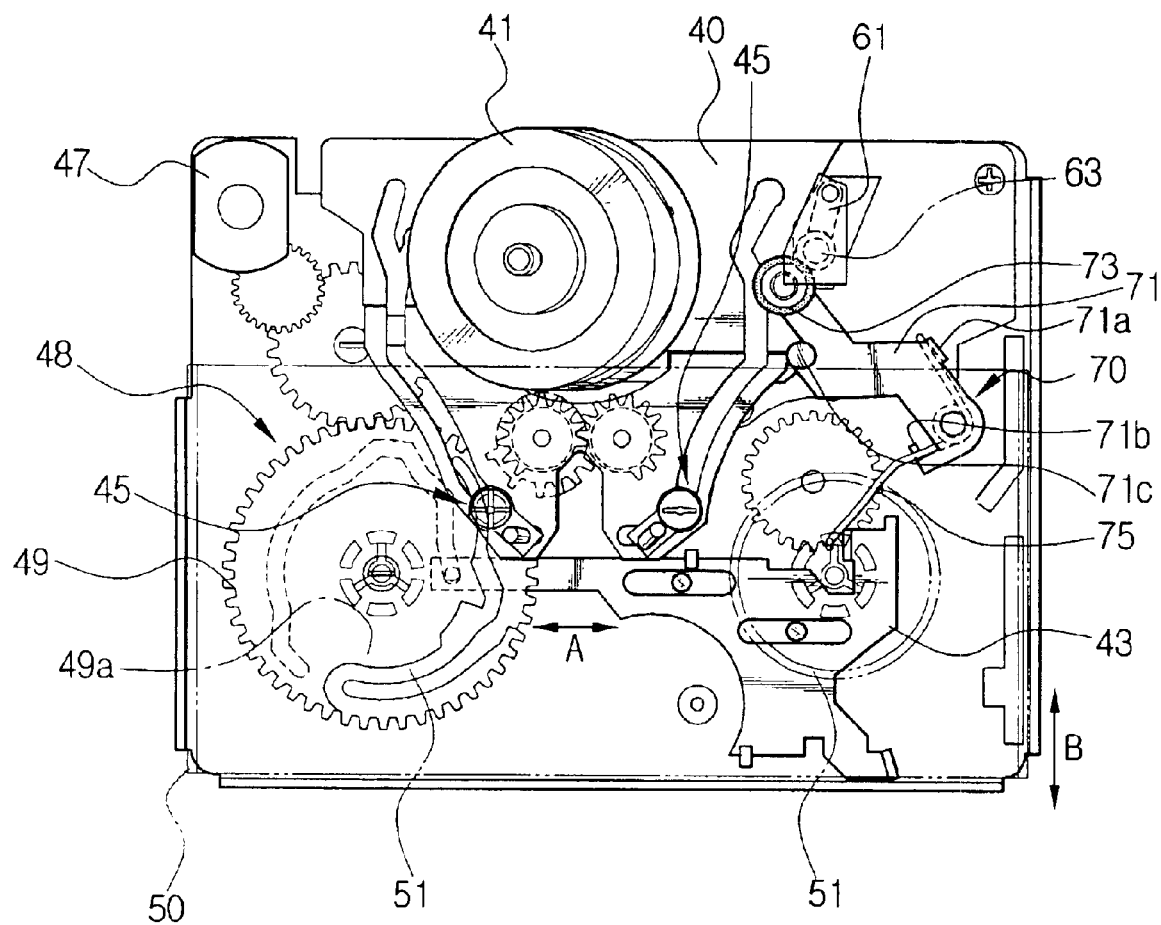
FIG. 3 is a drawing illustrating an example of the operation of a pinch-roller unit when a sub-deck is loaded.

The torsion spring 75 is coaxially disposed on the pivoting lever 71 to be wound around the pivoting shaft. Both ends of the torsion spring 75 are supported by the protrusions 71a and 71b, and are thereby prevented from being released. When the sub-deck 50 is loaded, the torsion spring 75 is stressed by being pushed by the sliding member 43, thereby pressing the pivoting lever 71 towards the capstan 63. Accordingly, the pinch roller 73 can be maintained in close contact with the capstan 63 as shown in FIG. 3. Also, because the torsion spring 75 is disposed on the pivoting lever 71 for pressing the pivoting lever 71, a plurality of parts used in a conventional pinch roller unit becomes unnecessary. Therefore, the cost and the number of assembling processes can be reduced, thereby improving the productivity.

The operation of the pinch roller unit 70 having the above-described structure in relation to the loading operation of the sub-deck 50 will now be described.

When the cassette is seated in the sub-deck 50 as shown in FIG. 2, the sub-deck 50 moves in the direction B. The power generated by the driving motor 47 moves the sub-deck 50 towards the head drum 41. The sub-deck 50 being loaded comes in contact with a protrusion 71c on the pivoting lever 71 and pushes the pivoting lever 71. Since the sub-deck 50 moves towards the head drum 41, it can also be referred to as a movable member. As described above, the sub-deck (movable member) 50 can be moved in both a loading and an unloading direction. As shown in FIG. 3, when the sub-deck 50 is completely loaded, the pinch roller 73 comes in contact with the capstan 63 as the pivoting lever 71 is pivoted. In that state, the sliding member 43 moves to the left direction in the direction A, and thus contacts and pushes an end of the torsion spring 75. Then, the torsion spring 75 is stressed and the torsion is transferred to the pivoting lever 71. Accordingly, the pinch roller 73 maintains its close contact with the capstan 63, thereby smoothly guiding the tape being conveyed through between the pinch roller 73 and the capstan 63.

As can be appreciated from the description of the pinch roller unit of a magnetic recording/reading apparatus set forth above, the structure in which a single torsion spring is provided to press a pivoting lever that supports a pinch roller can reduce the number of parts significantly when compared to the conventional pinch roller unit. As a result, costs can be reduced and the structure can be simplified. Moreover, the number of assembling processes can be reduced, thereby improving the productivity.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art.

What is claimed is:

1. A pinch roller unit, adapted to be disposed on a deck of a magnetic recording/reading apparatus on which a head drum and a capstan are disposed, to move in relation to movement of a movable member, which is disposed to move on the deck, to bring a tape into close contact with the capstan, the pinch roller unit comprising:
    a pivoting lever, rotatably disposed on the deck to pivot towards the capstan in relation to movement of the movable member;
    a pinch roller, rotatably disposed at an end of the pivoting lever and adapted to be brought into contact with the capstan during loading of the movable member; and
    a torsion spring that is stressed by being pushed by a sliding member sliding in at least one direction transverse of the deck, to push the pivoting lever towards the capstan.

2. A pinch roller unit as claimed in claim 1, wherein the torsion spring is coaxially connected with the pivoting lever and prevented from being released from the pivoting lever.

3. A pinch roller unit as claimed in claim 1, wherein the torsion spring is stressed and released over a predetermined angle by being pushed and released by the sliding member.

4. A pinch roller unit as claimed in claim 1, wherein the at least one transverse direction is transverse to the movement of the movable member.

5. A pinch roller unit as claimed in claim 1, wherein the pivoting lever includes a protrusion, such that when the movable member is loaded into the magnetic recording/reading apparatus the movable member comes in contact with the protrusion and pushes the pivoting lever.

6. A pinch roller unit as claimed in claim 1, wherein the movable member is a sub-deck capable of sliding on the deck in loading and unloading directions.

7. A pinch roller unit, adapted to be disposed on a main deck of a magnetic recording/reading apparatus on which a head drum and a capstan are disposed, to move in relation to movement of a sub-deck, which is disposed to slide on the main deck, to bring a tape into close contact with the capstan, the pinch roller unit comprising:
    a pivoting lever, rotatably disposed on the main deck to pivot towards the capstan in relation to movement of the sub-deck in a loading direction;
    a pinch roller, rotatably disposed at an end of the pivoting lever and adapted to be brought into contact with the capstan during loading of the sub-deck; and
    a torsion spring that is stressed by being pushed by a sliding member sliding in at least one direction transverse of the main deck, wherein the movement is transverse to the movement of the sub-deck, to push the pivoting lever towards the capstan.

8. A pinch roller unit as claimed in claim 7, wherein the torsion spring is coaxially connected with the pivoting lever and prevented from being released from the pivoting lever.

9. A pinch roller unit as claimed in claim 7, wherein the torsion spring is stressed and released over a predetermined angle by being pushed and released by the sliding member.

10. A pinch roller unit as claimed in claim 7, wherein the pivoting lever includes a protrusion, such that when the sub-deck is loaded into the magnetic recording/reading apparatus the sub-deck comes in contact with the protrusion and pushes the pivoting lever.

* * * * *